(12) United States Patent
Hehl

(10) Patent No.: US 7,252,494 B2
(45) Date of Patent: Aug. 7, 2007

(54) MOLD-CLOSING DEVICE FOR AN INJECTION MOLDING MACHINE USED FOR PROCESSING PLASTIC MATERIALS

(76) Inventor: Karl Hehl, Arthur-Hehl-Strasse, D-72290 Lossburg (DE)

( * ) Notice: Subject to any disclaimer, the term of this patent is extended or adjusted under 35 U.S.C. 154(b) by 161 days.

(21) Appl. No.: 10/547,285

(22) PCT Filed: Feb. 19, 2004

(86) PCT No.: PCT/EP2004/001568

§ 371 (c)(1),
(2), (4) Date: Aug. 24, 2005

(87) PCT Pub. No.: WO2004/076157

PCT Pub. Date: Sep. 10, 2004

(65) Prior Publication Data

US 2006/0193944 A1 Aug. 31, 2006

(30) Foreign Application Priority Data

Feb. 25, 2003 (DE) ................. 103 09 906

(51) Int. Cl.
*B29C 45/17* (2006.01)
(52) U.S. Cl. .................................. 425/190; 425/589
(58) Field of Classification Search ............... 425/190, 425/589, 595
See application file for complete search history.

(56) References Cited

U.S. PATENT DOCUMENTS 3,841,823 A * 10/1974 Hehl .................. 425/450.1
3,852,010 A 12/1974 Hehl
4,566,522 A * 1/1986 Fink et al. .................. 164/316
6,321,826 B1 * 11/2001 Fink et al. .................. 425/190

FOREIGN PATENT DOCUMENTS

| DE | 2 133 540 | 1/1973 |
|----|-----------|--------|
| DE | 102 09 921 | 10/2003 |
| EP | 1 121 237 | 8/2001 |
| JP | 2001-239561 | 1/2002 |
| WO | WO 95/07171 | 3/1995 |

OTHER PUBLICATIONS

International Search Report; PCT/EP2004/001568; Jun. 8, 2004.
"Zehn Arbeitsstellungen Bei Spritzgiessmaschinen" Plastverarbeiter, Zehner and Huethig Verlag, Speyer AM Rhein, DE, vol. 21, No. 11, Nov. 1970, pp. 995-999, XP001173212; ISSN: 0032-1338.

* cited by examiner

*Primary Examiner*—James P. Mackey
(74) *Attorney, Agent, or Firm*—Cantor Colburn LLP

(57) ABSTRACT

Disclosed is a mold-closing device for an injection molding machine used for processing plastic materials, in which the mold supports accommodating an injection mold therebetween and a support element (13) for a mold-closing mechanism (C) are mounted on the machine base (14). In order to be able to precisely align the mold supports, the first mold support is also mounted on the machine base (14) so as to be movable in the closing direction, the support element (13) is mounted on the machine base (14) or a part thereof via a stationary bearing, and a positioning mechanism (16) is provided for adjusting the angle between the support element (13) and the machine base (14).

11 Claims, 8 Drawing Sheets

MOLD-CLOSING DEVICE FOR AN INJECTION MOLDING MACHINE USED FOR PROCESSING PLASTIC MATERIALS

REFERENCE TO RELATED APPLICATIONS

The present application claims the priority of German Patent Application 103 09 906.9, filed on Feb. 25, 2003, the disclosure content of which is hereby incorporated by reference in its entirety.

FIELD OF THE INVENTION

The invention relates to a mould closing unit for an injection molding machine for processing of plastics materials and other plasticizable substances such as ceramic or pulverulent substances in accordance with the preamble of claim 1.

BRIEF DESCRIPTION OF RELATED ART

The conventional design of a plastics material injection molding machine, as underlies the preamble of claim 1, is made known in EP 1 121 237 B1 or DE 21 33 540 A. In the case of this type of injection molding machine, a stationary mould carrier is provided and it is fixedly secured to the machine base. A closing mechanism supported on a supporting member moves a movable mould carrier towards this stationary mould carrier and away from this stationary mould carrier in a cyclical manner and thereby closes the injection mould accommodated between the mould carriers. On the injection molding side, an injection molding unit abuts against the stationary mould carrier in order to inject plasticizable material into the mould cavity through an opening of the stationary mould carrier. The angular alignment and also the longitudinal alignment of the machine on the machine base are oriented on the stationary mould carrier. When the closing pressure is built up, the braces interconnecting the mould carriers are forcibly extended. This brace extension leads to a displacement of the supporting member in horizontal direction.

In principle, during injection molding, a precise mould closure is significant to the quality of the parts produced. In this regard, care must be taken to ensure that the mould carriers are disposed parallel to each other and not at an angle one to the other. The necessary angular perfection can certainly be realized with known injection molding machines, however in existing systems distortions can arise due to the parallelogram formed between supporting member, stationary mould carrier and movable mould carrier. These problems occur more especially when the mould closing unit is transferred into a vertical disposition. In this case, the fixed plate can tip due to the base securement and consequently a parallelogram is created. This makes it difficult to adjust the parallelity of the mould carriers and at the same time also makes it difficult to maintain the concentricity of the two centering bores in the mould carriers.

SUMMARY OF THE INVENTION

Proceeding from this state of the art, the present invention creates a mould closing unit, which enables precise alignment of the mould carriers one relative to the other.

The supporting member now becomes the fixed point within the system, which means that even the mould carrier, which up to now has been stationary, is displaceably mounted relative to the machine base. At the same time, the support plate can be secured and adjusted at preferably three points on the machine frame or a part thereof. The angularity of the supporting member can be adjusted by means of the adjusting mechanism. The effect of the brace extension on the "stationary" mould carrier is such that it is displaced in a cyclical manner. However, as the injection molding unit is fixedly connected to this mould carrier, this does not result in any reference problems with regard to the injection molding unit.

In a preferred embodiment, a three-point supporting of the supporting member is produced and this enables precise adjustment. This is effective in particular when the mould closing unit has to be transferred into a vertical position or is in this position permanently. Through the three-point supporting of the supporting member, the supporting member is retained at an angle relative to the machine base or to a pivotable bearing element in such a manner that no parallelogram is created. The entire weight of the injection mould and the mould carriers is supported rathermore centrally via the braces on the supporting member. Consequently, optimum parallelity and centricity is guaranteed in this position also.

Further advantages are produced from the sub claims and the following description.

BRIEF DESCRIPTION OF THE FIGURES

The invention is described in more detail below by way of the Figures. In which.

DETAILED DESCRIPTION OF PREFERRED EMBODIMENTS

The invention is now described in more detail as an example with reference to the enclosed drawings. However, the exemplified embodiments are only examples, which are not to restrict the inventive concept to any one specific arrangement.

Figure 1:
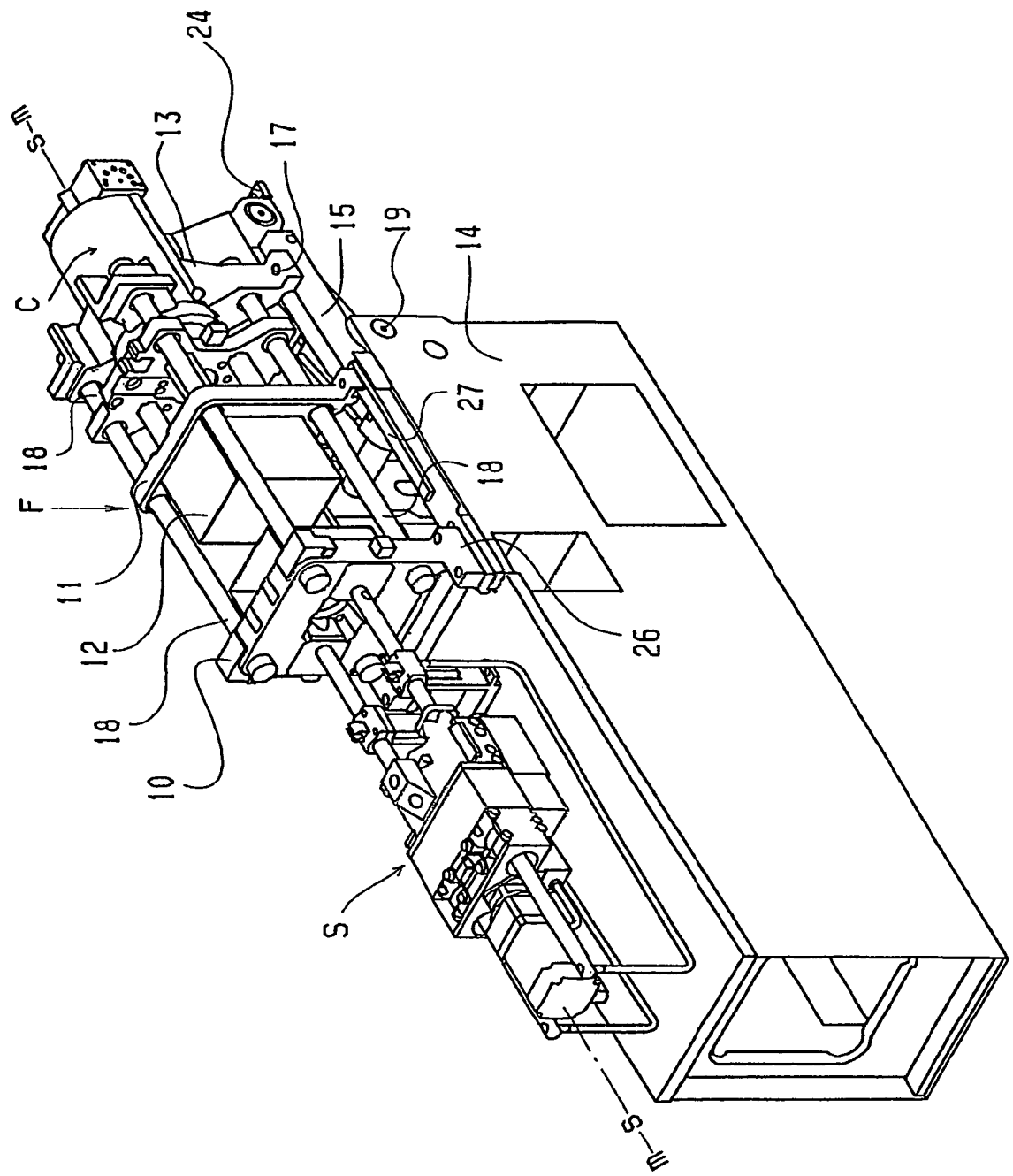
FIG. 1 is a three-dimensional view of a plastics material injection molding machine including mould closing unit and injection molding unit.
Figure 2:
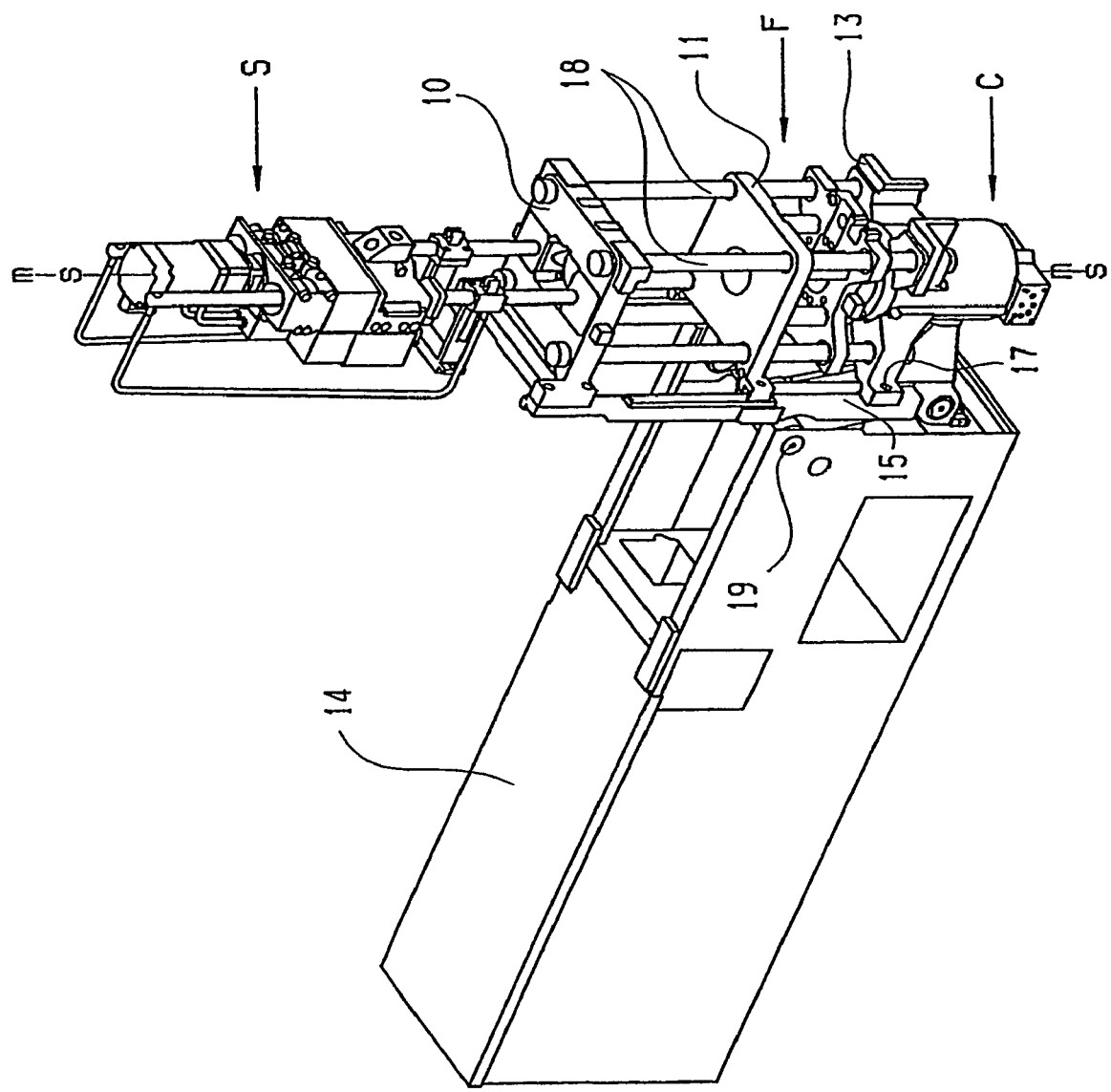
FIG. 2 is a representation as in FIG. 1 with the mould closing unit pivoted into vertical position.
Figure 3:
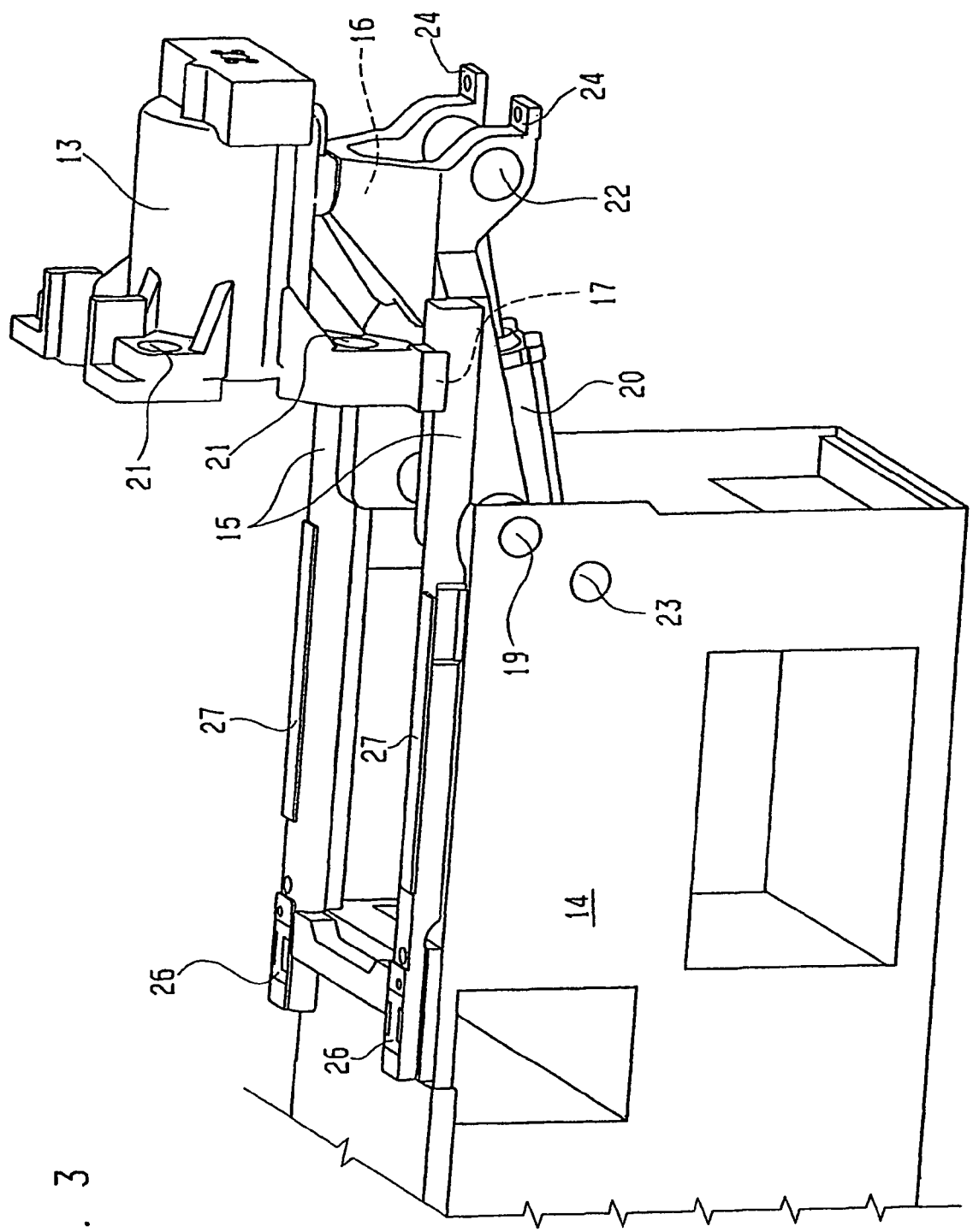
FIG. 3 is a three-dimensional view of the machine base with supporting member.
Figure 4:
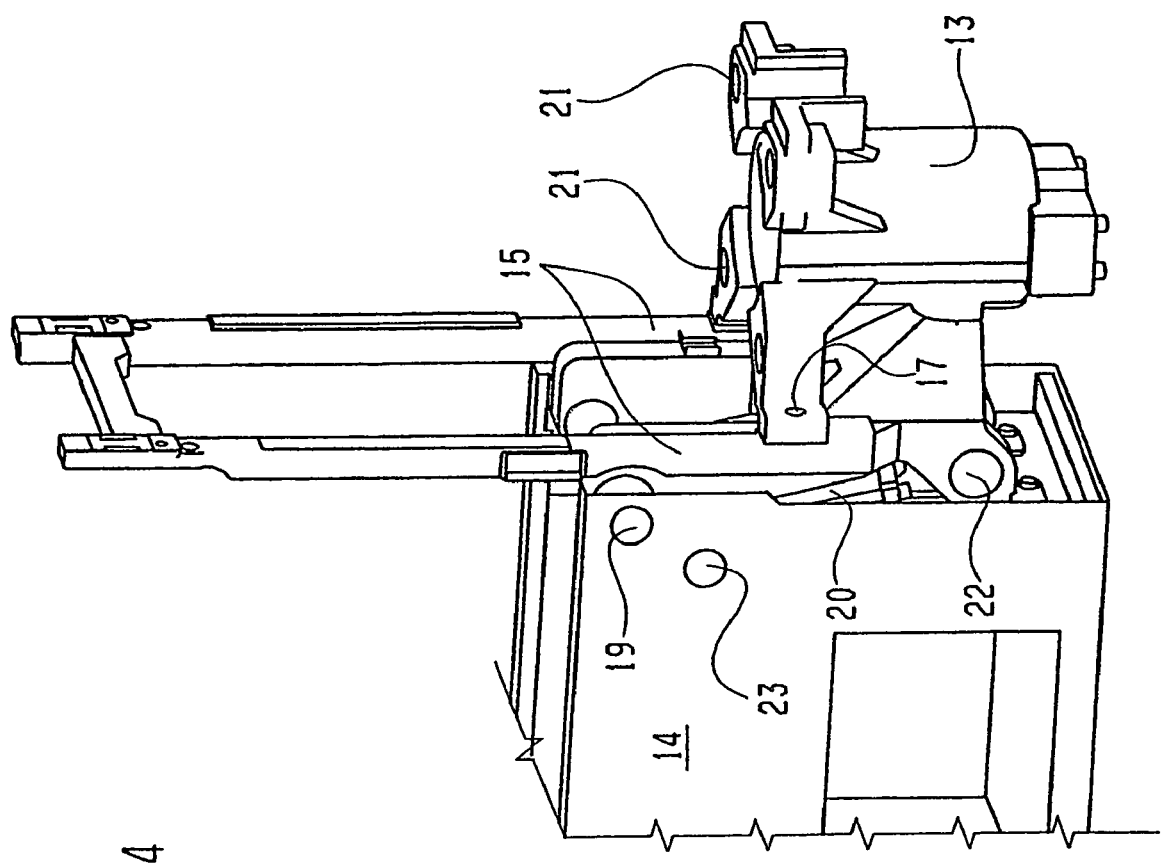
FIG. 4 is a representation as in FIG. 3 with the supporting member pivoted into vertical position.

FIGS. 1 and 2 show an injection molding machine for processing plastics materials and other plasticizable substances such as ceramic or pulverulent substances using a mould closing unit F and an injection molding unit S. In FIG. 2 the mould closing unit that is horizontally disposed in FIG. 1 is pivoted into a vertical position. The pivoting mechanism 20 necessary to accomplish this will be looked at in detail at a later point.

The injection molding machine has a first mould carrier 10, on which the injection molding unit S is preferably secured. In addition, an additional movable mould carrier 11 is provided which is displaceable relative to the first mould carrier 10 by means of a mould closing mechanism C. Between the mould carriers 10, 11 is provided a mould clamping area, in which at least one multiple-part injection mould is receivable between the mould carriers, the parts of the injection mould 12 being detachably secured to the mould carriers 10, 11. A supporting member 13 is provided for the mould closing mechanism C. The mould closing mechanism C is for the cyclical opening and closing of the injection mould 12 with the displacement of the additional movable mould carrier 11 towards the first mould carrier 10 and away from this first mould carrier 10 in the closing direction s-s of the injection mould 12.

Mould closing unit F and injection molding unit S are disposed on a machine base 14 and, where applicable, on a part of the machine base. The first mould carrier 10, the additional movable mould carrier 11 and the supporting member 13, in particular, are mounted on the machine base. Force transferring elements, which are provided in the form of braces 18 in the embodiment, absorb the forces occurring between the first mould carrier 10 and the supporting member 13 when the mould is closed and when the plasticizable substances are injected into the injection mould 12. A U-shaped force transferring element, which allows free access to the mould clamping area, can be provided in place of the braces 18.

Figure 7:
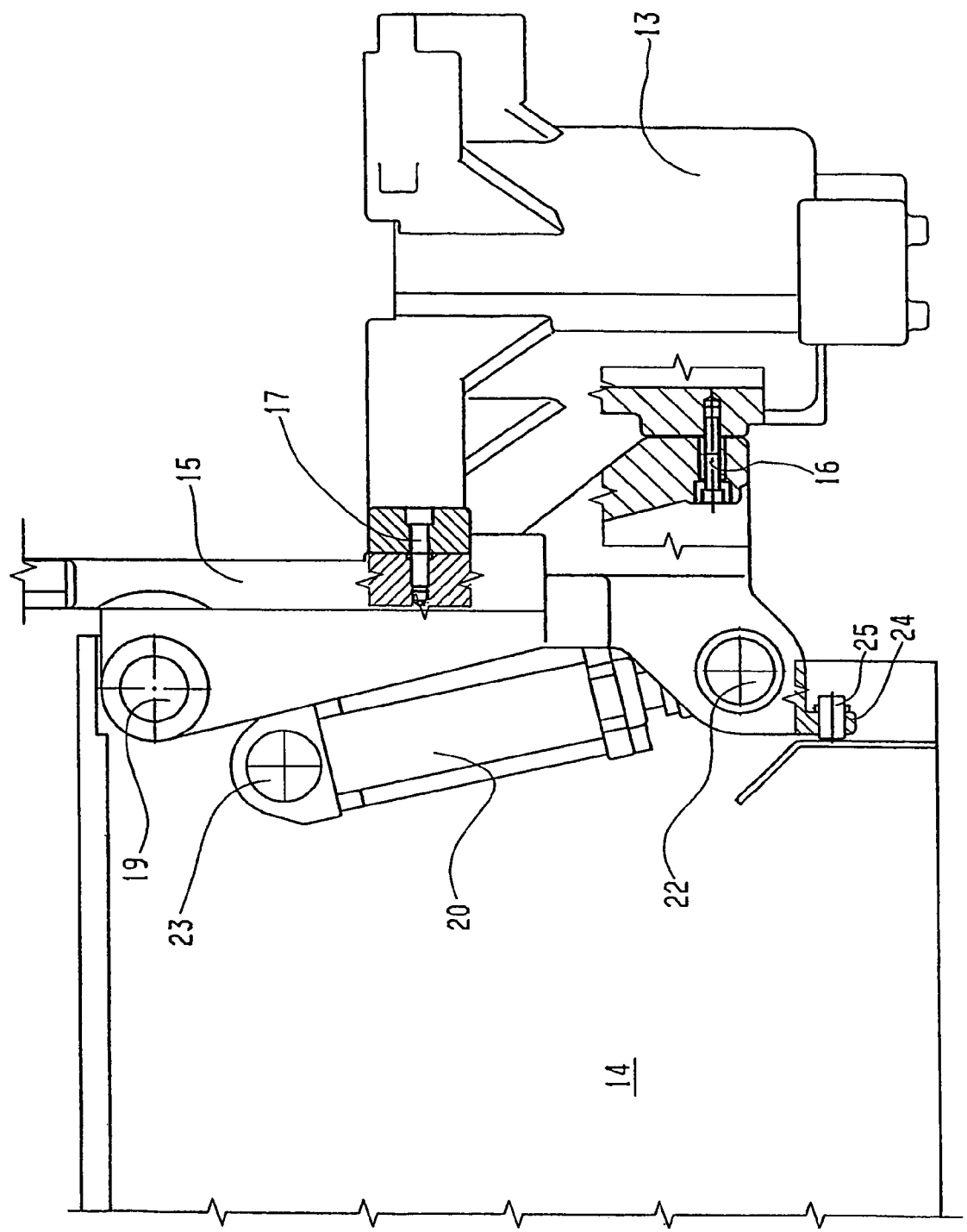
FIG. 7 is an enlarged, partial cut cutout from FIG. 6.
Figure 8:
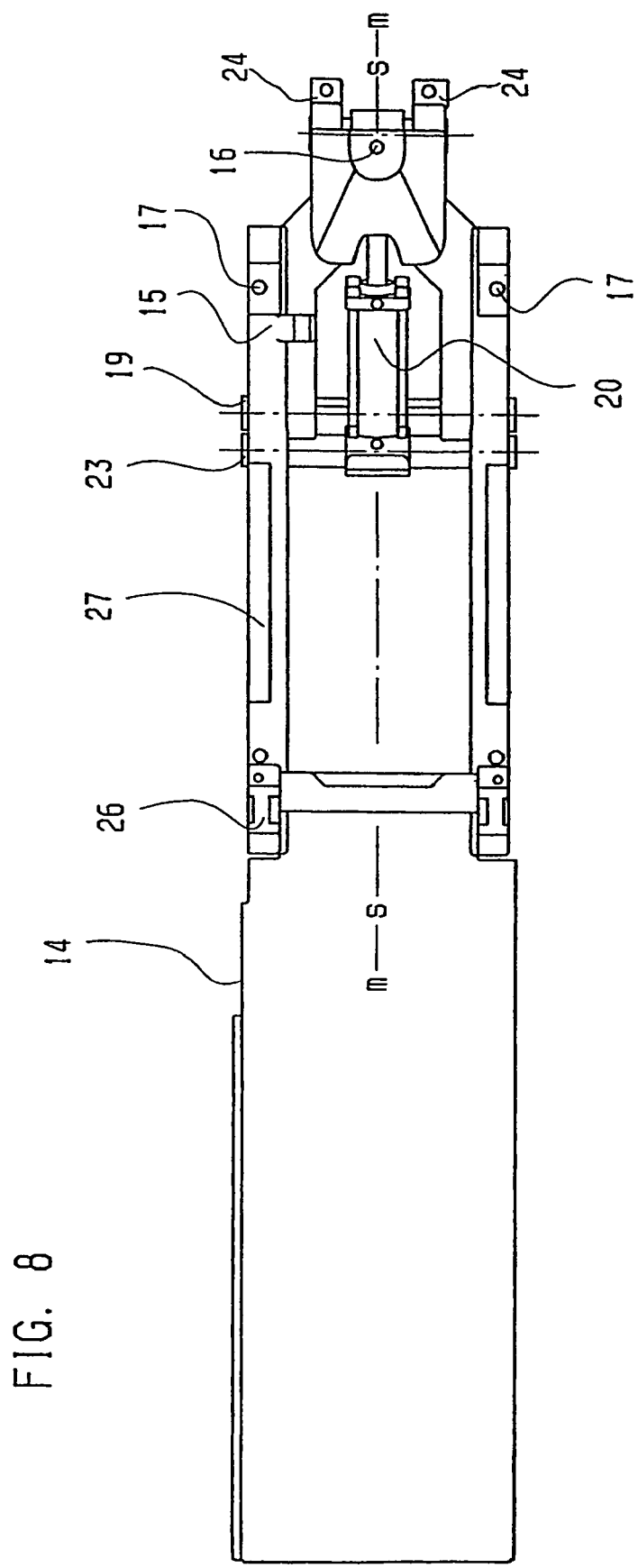
FIG. 8 is a top view of the machine base with the mould closing unit removed.

FIG. 8 in particular shows that the first mould carrier 10 is also mounted on the machine base or on a part thereof so as to be displaceable in the closing direction s-s. Consequently, both mould carriers are mounted so as to be displaceable in closing direction. The supporting member 13, contrary to this, is secured via a stationary bearing arrangement at the bearing points 17 on the machine base 14 or on a part thereof, such as, for example, on the bearing element 15. In addition, an adjusting mechanism 16 (FIG. 7) is provided for adjusting the angle between the supporting member 13 and the machine base 14 or the part of the machine base. According to FIGS. 7 and 8, the stationary bearing arrangement of the supporting member 13 on the machine base 14 or a part thereof is spaced from the adjusting mechanism 16 in the closing direction s-s. The stationary bearing arrangement of the supporting member 13 is effected at the bearing points 17, which are disposed on both sides of a central line m-m and the connecting line therebetween is at right angles to the closing direction s-s. The two bearing points 17 and the adjusting mechanism 16 as the third point consequently form a three-point bearing arrangement, which allows precise adjustment of the supporting member relative to the machine base. The supporting member is preferably produced from one piece, as is known from former patent application DE 102 09 921. According to the solution there, the supporting member itself is also one-piece and compact such that a high level of dimensional accuracy of the supporting surfaces is produced. In principle, however, the adjusting mechanism 16 can also engage another part of the mould closing unit F, which is preferably fixedly connected to the supporting member.

Consequently, the three-point bearing arrangement firstly guarantees that, via the bearing points 17, a disposition at right angles to the central line of the injection molding machine is guaranteed, whilst via the third point, that is to say via the adjusting mechanism 16, the angularity of the plate is adjustable. The compact supporting member at the same time produces a wide support base, which also meets the demands for vertical operation. The supporting member is stable in itself and no parallelogram is created as the entire weight of injection mould and mould carriers is supported centrally via the four braces 18 relative to the supporting member. Consequently, optimum parallelity and centricity is guaranteed.

Figure 6:
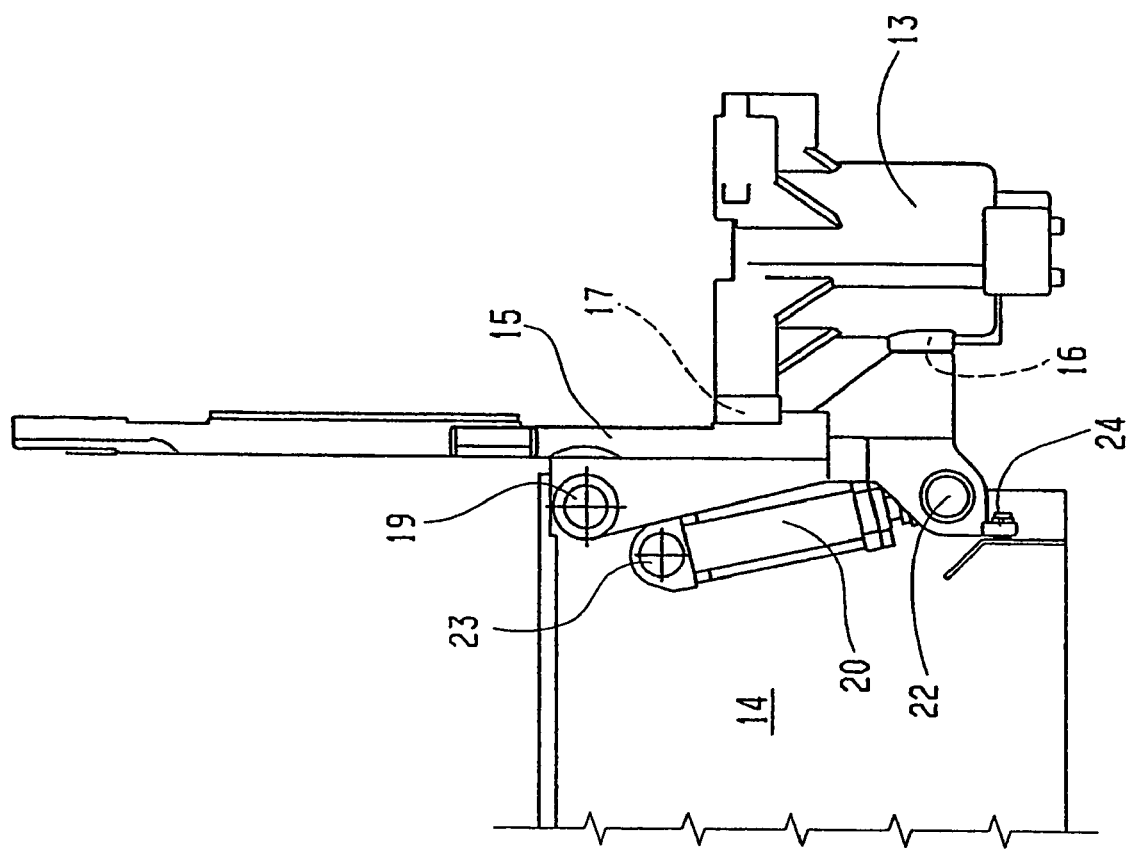

According to FIG. 7, the adjusting mechanism 16 is in the form of a vertical adjusting means for a part of the supporting member 13 spaced from the stationary bearing arrangement. Where applicable, this part can, however, also be an other part of the mould closing unit connected to the supporting member. FIGS. 2, 4, 6 and 7 show the disposition of the mould closing unit in the vertical position. In principle, it is also possible to provide a stationary disposition of the supporting member without a pivoting mechanism, however, in the exemplified embodiments the mould closing unit, but at least the supporting member 13, is mounted on a part of the machine base 14, a pivotable bearing element 15. When pivoting, this bearing element 15 enables a transferring at least of the mould closing unit F from a horizontal position of the closing directing s-s into a vertical position. During this pivoting movement, the injection mould unit S can also be pivoted at the same time—as is shown in the embodiment in FIG. 2—if it is secured to the first mould carrier 10, however, in principle injection into the separating plane can also be accomplished.

Figure 5:
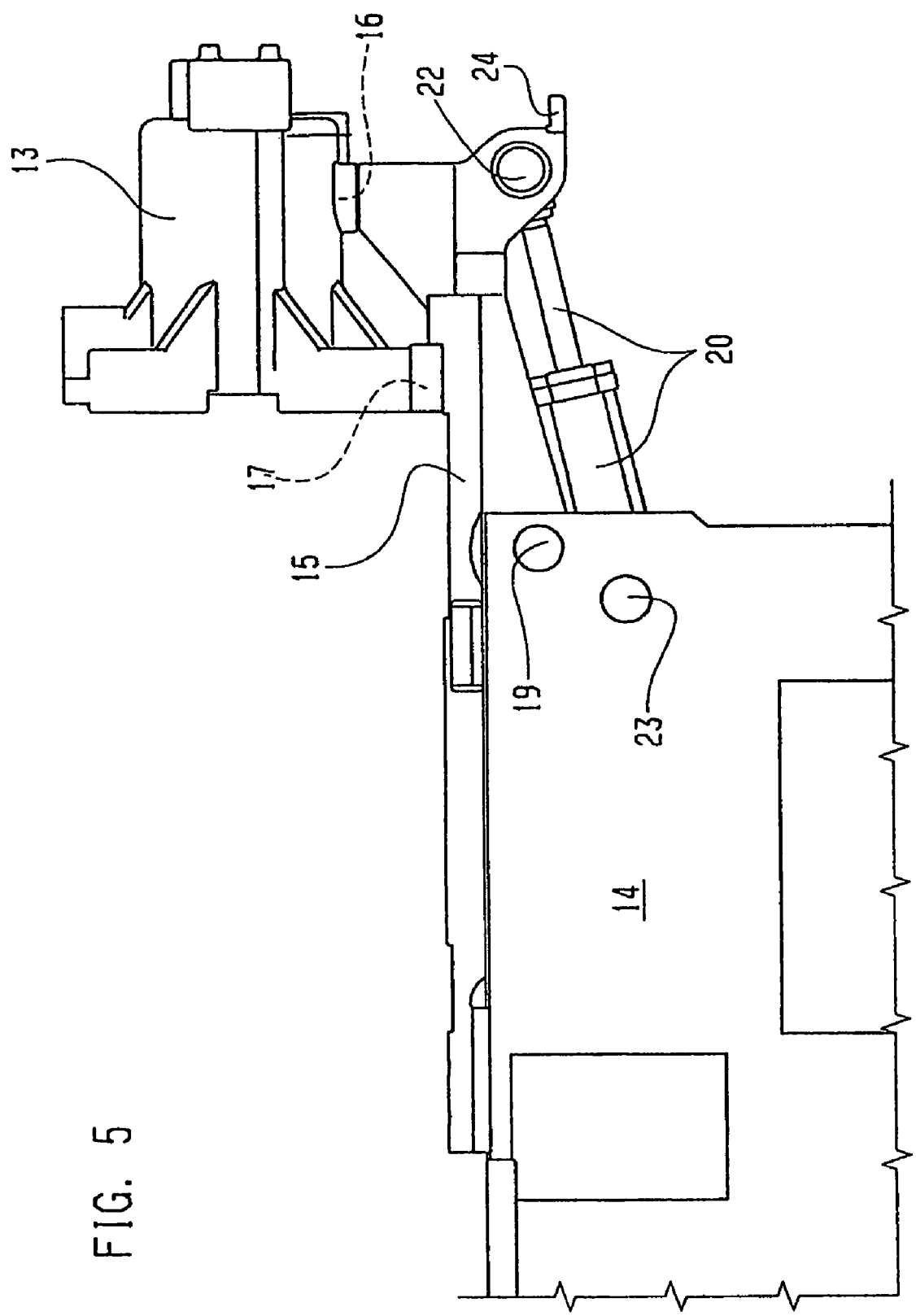
FIGS. 5,6 are side views of the representation in FIGS. 3 and 4.

FIGS. 3 to 7 show the pivoting mechanism 20. The bearing element 15 is rotationally displaceable relative to the machine base at the pivotal axis 19. The pivoting mechanism 20 is mounted at the pivotal axes 22, 23 on the supporting member 13 and on the machine base, such that when the pivoting mechanism 20 is actuated, as is represented in FIGS. 5 and 6, the transfer from the horizontal position into the vertical position is effected. The supporting member 13 has brace receiving means 21 and at its rear end also bearing means 24, which come to rest on a bearing face of the machine base 14 during the transfer into the vertical displacement. According to FIG. 7, adjustment elements 25 can be provided on the bearing faces 24 in order to adjust the system. FIG. 7 shows the securement at the bearing points 17 as well as the adjusting mechanism 16 for the supporting member 13.

According to FIG. 8, bearing members 26 are provided for the first mould carrier 10 as well as a guiding for the additional, movable mould carrier 11. These are disposed in the exemplified embodiment on a turntable as bearing element 15. In principle, however, it is possible to only use the rear part of the bearing element 15, which bears the actual supporting member 13, as the mould carriers are guided directly onto corresponding surfaces of the machine base 14. In the case of a vertical disposition, the supporting is effected anyway via the braces on the supporting member such that further guiding of the mould carriers is not necessary.

It is obvious that this description can be subject to the most varied modifications, changes and adaptations which range in the region of equivalents to the attached claims.

The invention claimed is:

1. Mould closing unit for an injection molding machine for processing plastics materials and other plasticizable substances, said mould closing unit comprising:
   a first mould carrier;
   an additional movable mould carrier displaceable relative to the first mould carrier;
   at least one multi-part injection mould receivable between the first mould carrier and the additional movable mould carrier, parts of the at least one multi-part injection mould being detachably secured to the mould carriers;
   a supporting member for a mould closing mechanism for a cyclical opening and closing of the injection mould and for displacement of the additional movable mould carrier toward and away from the first mould carrier in closing direction of the injection mould;

a machine base comprising at least one part, the first mould carrier, the additional, movable mould carrier and the supporting member being mounted on said machine base;

wherein the first mould carrier is mounted on the machine base so as to be displaceable in the closing direction and the supporting member is mounted on the machine base via a stationary bearing arrangement; and wherein an adjusting mechanism is provided for adjusting an angle between the supporting member and the machine base.

2. Mould closing unit according to claim 1, wherein at least two parts comprising at least one of the first mould carrier, the additional movable mould carrier, and the supporting member are mounted on different parts of the machine base.

3. Mould closing unit according to claim 1, wherein the stationary bearing arrangement of the supporting member on the machine base is spaced from the adjusting mechanism in the closing direction.

4. Mould closing unit according to claim 1, wherein the stationary bearing arrangement of the supporting member is effected at least two bearing points which are disposed on both sides of a central line of the mould closing unit and a connecting line therebetween is at right angles to the closing direction.

5. Mould closing unit according to claim 4, wherein the two bearing points of the stationary bearing arrangement of the supporting member and the adjusting mechanism as a third point form a three-point bearing arrangement.

6. Mould closing unit according to claim 1, wherein the disposition of the first mould carrier and the additional movable mould carrier is adjustable by the adjusting mechanism through the connection between the supporting member and the first mould carrier and the additional movable mould carrier by means of force transferring elements.

7. Mould closing unit according to claim 6, wherein the force transferring elements are braces.

8. Mould closing unit according to claim 1, wherein the adjusting mechanism is a vertical adjusting means for a part of the supporting member that is spaced from the stationary bearing arrangement or for a part of the mould closing unit that is connected to the supporting member.

9. Mould closing unit according to claim 1, wherein, when a nozzle of an injection molding unit is applied to the first mould carrier, the first mould carrier is a neutral point for the injection molding unit.

10. Mould closing unit according to claim 1, wherein the at least one part of the machine base is a bearing element which is pivotable relative to the machine base and which, when pivoted, allows a transferring of at least the mould closing unit from a horizontal position of the closing direction into a vertical position of the closing direction.

11. Mould closing unit according to claim 10, wherein, when pivoted, the injection molding unit secured to the first mould carrier is also pivotable at the same time.

* * * * *